UNITED STATES PATENT OFFICE.

WARREN F. BLEECKER, OF BOULDER, COLORADO, ASSIGNOR TO THE TUNGSTEN PRODUCTS COMPANY, OF BOULDER, COLORADO, A CORPORATION OF COLORADO.

PROCESS OF PRODUCING TUNGSTIC OXID.

1,399,245. Specification of Letters Patent. Patented Dec. 6, 1921.

No Drawing. Application filed June 9, 1920. Serial No. 387,670.

*To all whom it may concern:*

Be it known that I, WARREN F. BLEECKER, a citizen of the United States, residing at Boulder, in the county of Boulder and State of Colorado, have invented certain new and useful Improvements in Processes of Producing Tungstic Oxid, of which the following is a specification.

My invention relates to a process of producing tungstic oxid and it has for its object to provide a practical, simple and inexpensive method of obtaining a practically insoluble tungstic oxid in granular form.

With the above and other objects in view, my improved process consists in first obtaining an alkaline solution containing sodium tungstate ($Na_2WO_4$) by any well-known method, as for example, heating tungsten ore under pressure with a solution containing caustic soda.

The sodium tungstate is removed from the solution in a commercially pure condition by evaporation and crystallization according to standard practice, after which the sodium tungstate crystals are removed from the residual or mother liquid.

The above described method of producing sodium tungstate is well known in the art and is not an essential part of the invention, it being obvious that sodium tungstate obtained if possible in any other way, is equally suitable for the production of the tungstic oxid by my process.

The sodium tungstate is mixed with sulfuric acid and thoroughly stirred to obtain a more or less intimate mixture which when heated to a certain temperature produces tungstic oxid in intermixture with sodium sulfate and other soluble salts.

In order to bring the sodium tungstate and sulfuric acid to the proper condition for the intimate intermixture required to effect the reactions by which the tungstic oxid is produced a certain amount of moisture is desirable.

The percentage of moisture in the mixture must naturally vary in accordance to the nature and specific gravity of the acid used, it being understood that instead of using commercial sulfuric acid as stated above, an acid of somewhat stronger or weaker content or acid sodium sulfate known in the trade as "niter cake" and containing about 30% of sulfuric acid, may be used in decomposing the sodium tungstate.

Commercial sulfuric acid is, however, best adapted for the purpose and the most satisfactory results are produced by mixing the sodium tungstate with slightly more (preferably 10%) than the theoretical amount of sulfuric acid, 60% Baumé, in the presence of about 12% moisture.

The proper degree of moisture may be obtained by adjustment of the moisture content of the sodium tungstate after it is removed from the mother liquid either by drying or by the addition of more water.

The mixture of sodium tungstate and sulfuric acid is thoroughly stirred to produce the following reaction:

(1) 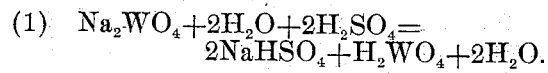
$$Na_2WO_4 + 2H_2O + 2H_2SO_4 = 2NaHSO_4 + H_2WO_4 + 2H_2O.$$

The chemical reaction generates heat during the stirring and this results in driving off a considerable amount of contained water and after the mixture has been standing for some time and has become cooled to room temperature, the mass becomes dry and lumpy.

Upon further stirring of the dried material the lumps thereof are disintegrated so that the mass finally consists of grains varying from egg-size down. The mass of granular material is now subjected to heat sufficient to expel all of the water and to break up the sodium bisulfate which was formed during the first reaction, resulting in the formation of tungstic oxid and sodium sulfate according to the following reactions:

(2) 
$$Na_2WO_4 + 2NaHSO_4 + heat = WO_3 + H_2O + 2Na_2SO_4$$

and (3) 
$$H_2WO_4 + heat = WO_3 + H_2O.$$

To heat the material to the required temperature it may be placed in a furnace from which it is continuously or intermittently discharged.

To properly expel the moisture from the granular mass and produce the above-stated reactions, the material should be brought to a low red heat and maintained at that temperature for at least fifteen minutes, although it has been found that even at the fuming temperature of sulfuric acid the reactions are practically complete.

The material discharged from the furnace is, when in a cooled condition, washed by standard methods for the purpose of removing the major portion of the sodium sulfate and such other salts as may be present in soluble form.

In order to entirely repress solution of the tungsten, from one-half to one per cent. of free hydrochloric acid may be added to the wash water, and if the washing is continued to a sufficient extent, the soluble salts present in the material may be removed to any desired degree.

The product of the last step of the process is tungstic oxid in granular form and which is practically insoluble in the wash water.

I am aware that different mineral acids have been used in other processes for the precipitation of tungsten from solutions of sodium tungstate. The tungsten oxid formed in this manner is, however, of a colloidal nature which makes it very difficult to remove the soluble salts by washing. Moreover, a considerable quantity of the tungsten is soluble in the liquors used for its precipitation and must either be removed by a subsequent process or rejected, and I desire it understood that both these objectionable features are absent in my process as hereinbefore described, it being apparent that the granular form of the tungsten oxid produced thereby greatly facilitates washing and filtration and that the oxid is insoluble except in extremely small quantities.

What I claim and desire to secure by Letters-Patent is:

1. The herein described process of producing tungstic oxid consisting in stirring moist sodium tungstate with sulfuric acid, subjecting the mixture to heat and washing the product.

2. The herein described process of producing tungstic oxid consisting in stirring moist sodium tungstate with sulfuric acid, subjecting the mixture to heat so as to produce the following reactions:

$$Na_2WO_4 + 2NaHSO_4 = WO_3 + H_2O + 2Na_2SO_4$$
$$H_2WO_4 + heat = WO_3 + H_2O,$$

and washing the product.

3. The herein described process of producing tungstic oxid consisting in stirring moist sodium tungstate with sulfuric acid, subjecting the mixture to heat and washing the product in water containing from one half to one per cent. free hydrochloric acid.

4. The herein described process of producing tungstic oxid consisting in stirring sodium tungstate containing approximately 12 per cent. moisture, with sulfuric acid, subjecting the mixture to heat and washing the product.

5. The herein described process of producing tungstic oxid consisting in stirring sodium tungstate with slightly more than the theoretical amount of sulfuric acid, subjecting the mixture to heat and washing the product.

6. The herein-described process of producing tungstic oxid consisting in stirring sodium tungstate containing approximately 12 per cent. moisture, with slightly more than the theoretical amount of sulfuric acid, resulting in the following reaction:

$$Na_2WO_4 + 2H_2O + 2H_2SO_4 = 2NaHSO_4 + H_2WO_4 + 2H_2O,$$

subjecting the mixture to heat so as to produce the following reactions—

$$Na_2WO_4 + 2NaHSO_4 = H_2WO_4 + 2Na_2SO_4$$
$$H_2WO_4 + heat = WO_3 + H_2O,$$

and washing the product.

7. The herein described process of producing tungstic oxid consisting in stirring sodium tunstate with sulfuric acid, subjecting the mixture to heat and washing the product.

In testimony whereof I have affixed my signature.

WARREN F. BLEECKER.